(12) United States Patent
Caram et al.

(10) Patent No.: US 8,715,394 B2
(45) Date of Patent: May 6, 2014

(54) AUTOTHERMAL CYCLE FOR CO$_2$ CAPTURE

(75) Inventors: Hugo S. Caram, Allentown, PA (US);
Alberto I. LaCava, Bethlehem, PA (US)

(73) Assignee: Lehigh University

( * ) Notice: Subject to any disclaimer, the term of this patent is extended or adjusted under 35 U.S.C. 154(b) by 230 days.

(21) Appl. No.: 13/302,351

(22) Filed: Nov. 22, 2011

(65) Prior Publication Data

US 2012/0125194 A1    May 24, 2012

Related U.S. Application Data

(60) Provisional application No. 61/416,977, filed on Nov. 24, 2010.

(51) Int. Cl.
*B01D 53/02* (2006.01)
*B01D 53/14* (2006.01)
*B01D 53/62* (2006.01)

(52) U.S. Cl.
CPC ............ *B01D 53/1475* (2013.01); *Y02C 10/08* (2013.01); *B01D 2257/504* (2013.01); *B01D 2253/10* (2013.01); *B01D 2253/102* (2013.01); *B01D 2253/104* (2013.01); *B01D 2253/106* (2013.01); *B01D 2253/108* (2013.01); *B01D 2253/1085* (2013.01); *B01D 53/62* (2013.01)
USPC ....................... 95/139; 95/41; 95/148; 96/115

(58) Field of Classification Search
CPC .............. B01D 53/62; B01D 53/1475; B01D 2253/10; B01D 2253/102; B01D 2253/104; B01D 2253/106; B01D 2253/108; B01D 2253/1085; B01D 2257/504; Y02C 10/08
USPC ................................ 95/41, 139, 148; 96/115
See application file for complete search history.

(56) References Cited

U.S. PATENT DOCUMENTS

| | | | | |
|---|---|---|---|---|
| 6,902,602 | B2 * | 6/2005 | Keefer et al. | 95/97 |
| 7,871,457 | B2 * | 1/2011 | Shah et al. | 95/96 |
| 2004/0011198 | A1 * | 1/2004 | Keefer et al. | 95/113 |
| 2008/0127632 | A1 * | 6/2008 | Finkenrath et al. | 60/274 |
| 2010/0005966 | A1 * | 1/2010 | Wibberley | 95/179 |
| 2010/0029466 | A1 * | 2/2010 | Woodhouse | 502/55 |
| 2010/0040520 | A1 * | 2/2010 | Hufton et al. | 422/211 |
| 2011/0296872 | A1 * | 12/2011 | Eisenberger | 62/640 |

* cited by examiner

*Primary Examiner* — Christopher P Jones
(74) *Attorney, Agent, or Firm* — The Belles Group, P.C.

(57) ABSTRACT

Provided herein are methods and apparatus for capturing or otherwise decreasing the amount of CO$_2$ in an exhaust stream. The separation process for removing CO$_2$ from a waste stream preferably operates substantially at atmospheric pressure and at a preselected temperature, and without the need of thermal swing regeneration. This novel elimination of the heat up and cool down periods allows the inventive cycle herein to be run faster, and more efficiently than in previously known systems. Further, in some examples herein, the heat of adsorption is used to provide the heat of regeneration.

11 Claims, 14 Drawing Sheets

TABLE – EXAMPLE ADSORBENTS

| Cycle: | 5-145-5-145 sec | | Feed Flow Avge: | 1.165 | mol/s/m3 | |
|---|---|---|---|---|---|---|
| Steam Feed: | 1.332 | | | | | |
| CO2 in the feed | 15 | | % molar | Basis | 1 m3 of adsorbent | |

| Temp C | % CO2 in steam recovered | % CO2 in gas to Stack | % CO2 in recycle to feed | CO2 % recovery in steam | CO2 % Recovery to stack | CO2 % Recovery to recycle | Adsorbent |
|---|---|---|---|---|---|---|---|
| 60 | 7.21 | 6.54 | 12.24 | 57.96 | 38.70 | 3.20 | NaAA |
| 150 | 7.87 | 5.62 | 12.40 | 63.65 | 32.91 | 3.31 | NaAA |
| 250 | 9.11 | 3.73 | 13.70 | 74.65 | 21.39 | 3.81 | NaAA |
| 350 | 10.80 | 0.98 | 14.57 | 90.26 | 5.45 | 4.22 | NaAA |
| 450 | 11.14 | 0.45 | 15.00 | 92.14 | 2.52 | 4.43 | NaAA |
| 550 | 9.97 | 2.30 | 15.23 | 82.45 | 13.01 | 4.48 | NaAA |
| 100.00 | 10.79 | 1.05 | 15.04 | 89.80 | 5.90 | 4.36 | AC-BS-270C |
| 130.00 | 8.81 | 4.29 | 15.06 | 70.69 | 24.90 | 4.31 | AC-BS-270C |
| 160.00 | 8.01 | 5.29 | 15.09 | 64.63 | 31.06 | 4.32 | AC-BS-270C |
| 150.00 | 15.38 | 7.13 | 15.14 | 5.02 | 88.26 | 1.26 | Silicalite |
| 150.00 | 15.40 | 7.05 | 15.15 | 6.61 | 87.16 | 1.26 | Silicalite |

FIG. 4

TABLE 2: Summary of Performance Results at Different Temperatures

| Cycle: | 5-145-5-145 sec | | Feed Flow Avge: | 1.332 mol/s/m3 | | 1.165 mol/s/m3 | | |
|---|---|---|---|---|---|---|---|---|
| Steam Feed: | | | | | | | | |
| CO2 in the feed | | | 15 % molar | | Basis | 1 m3 of adsorbent | | |
| Temp C | % CO2 in steam recovered | % CO2 in gas to Stack | % CO2 in recycle to feed | CO2 % recovery in steam | CO2 % Recovery to stack | CO2 % Recovery to recycle | Adsorbent |
| 100 | 7.21 | 6.54 | 12.24 | 57.96 | 38.70 | 3.20 | NaAA |
| 150 | 7.87 | 5.62 | 12.40 | 63.65 | 32.91 | 3.31 | NaAA |
| 250 | 9.11 | 3.73 | 13.70 | 74.65 | 21.39 | 3.81 | NaAA |
| 350 | 10.80 | 0.98 | 14.57 | 90.26 | 5.45 | 4.22 | NaAA |
| 450 | 11.14 | 0.46 | 15.00 | 92.14 | 2.52 | 4.43 | NaAA |
| 550 | 9.97 | 2.30 | 15.23 | 82.43 | 13.01 | 4.48 | NaAA |

Fig. 13

AUTOTHERMAL CYCLE FOR CO$_2$ CAPTURE

CROSS REFERENCE TO RELATED APPLICATION(S)

This application claims priority from U.S. Provisional Patent Application Ser. No. 61/416,977 filed Nov. 24, 2010 which is hereby incorporated by reference as if fully set forth.

FIELD OF INVENTION

The present invention relates to pollution control, and more particularly to capture of carbon dioxide from waste streams such as exhaust streams generated by combustion facilities.

BACKGROUND

Carbon dioxide ($CO_2$) is widely recognized as an undesirable waste product of combustion, contributing to pollution of air, and greenhouse gases. As a result, the emission of $CO_2$ is increasingly regulated by governments. This is especially true for large emission sources, such as power plants, factories, and other industrial combustion-driven facilities.

Therefore, there exists a continuing need for methods and apparatus for capturing or otherwise decreasing the amount of $CO_2$ in an exhaust stream. There further exists a need for solutions that are easy to implement, cost efficient, and effective.

SUMMARY

The disclosed embodiments satisfy the need in the art by providing methods and apparatus for capturing or otherwise decreasing the amount of $CO_2$ in an exhaust stream. The solutions provided herein are easy to implement, cost efficient, and effective.

In an embodiment, provided is a method to separate carbon dioxide from an exhaust stream from a combustion source, the method comprising a repeatable cycle comprising the steps of: a) providing a bed comprising a $CO_2$ selective solid-state adsorbent selected to remain in its solid state and to retain its selectivity for $CO_2$ upon repeated exposure to steam at a preselected operating temperature; b) contacting the bed with a combustion exhaust gas to remove $CO_2$ from the combustion exhaust gas, thereby forming a solid-state adsorbent having bound $CO_2$ thereon, and a cleaned exhaust stream that contains less than about 5% $CO_2$; c) thereafter, contacting the bed containing solid-state adsorbent having CO2 adsorbed thereon with a sweep gas comprising steam to remove combustion exhaust gas remaining in the bed; d) hereafter, contacting the bed with steam to thereby remove $CO_2$ from the bed, and to thereby generate a gas comprising steam and $CO_2$; e) conveying the gas comprising steam and $CO_2$ to a vapor recompression system, and operating the vapor recompression system to thereby recover water, remove heat, and produce compressed $CO_2$ gas from the gas comprising steam and $CO_2$; and f) utilizing the water and heat recovered by the vapor recompression system to generate the sweep gas comprising steam, wherein, upon performance of the cycle, more than about 90% of the carbon contained in the combustion exhaust gas is recovered.

In another embodiment, a system is provided for autothermal capture of $CO_2$ the system including A system for executing the method of claim 1, the system comprising: a) a bed containing a $CO_2$ selective solid state adsorbent, the bed having an inlet adapted for fluid communication with a combustion exhaust source; b) a steam source, the steam source in fluid communication with the bed; and c) a vapor recompression system, the vapor recompression system in fluid communication with the bed and in thermal communication with the steam source, the vapor recompression system configured and arranged to remove heat, water, and $CO_2$ from any gas stream comprising steam and $CO_2$ that is received from the bed.

In yet another embodiment, a method is provided that includes A method of separating carbon dioxide from an exhaust stream from a combustion source, the method comprising the steps of: a) providing a system comprising: b) a bed containing a solid state adsorbent, the bed having an inlet adapted for fluid communication with a combustion exhaust source; c) a steam source, the steam source in fluid and thermal communication with the bed; and d) a vapor recompression system, the vapor recompression system in fluid communication with the bed and in thermal communication with the steam source, the vapor recompression system configured and arranged to remove heat, water, and $CO_2$ from any gas stream comprising steam and $CO_2$ that is received from the bed. In this example, the method further includes operating the system to perform the steps of a) contacting the combustion exhaust gas with a bed containing a $CO_2$ selective solid-state adsorbent to remove $CO_2$ from the combustion exhaust gas, thereby forming a solid-state adsorbent having bound $CO_2$ thereon, and a cleaned exhaust stream that contains less than about 5% $CO_2$; b) thereafter, contacting the bed containing solid-state adsorbent having CO2 adsorbed thereon with a sweep gas comprising steam from the steam source to remove combustion exhaust gas remaining in the bed; c) thereafter, contacting the bed with steam to thereby remove $CO_2$ form the bed, and to thereby generate a gas comprising steam and $CO_2$; d) conveying the gas comprising steam and $CO_2$ to a vapor recompression system, and operating the vapor recompression system to thereby recover water, remove heat, and compressed $CO_2$ gas; and e) distributing heat and water recovered by the vapor recompression system to the steam source to generate steam for use within the system. In this example, upon operation of the system to perform the repeatable cycle, more than about 90% of the carbon contained in the combustion exhaust gas is recovered, and wherein the system is Autothermal.

BRIEF DESCRIPTION OF THE DRAWING(S)

FIG. 4 is a table illustrating exemplary adsorbent performance in an example system and process in accordance with the present invention.

Figure 5:
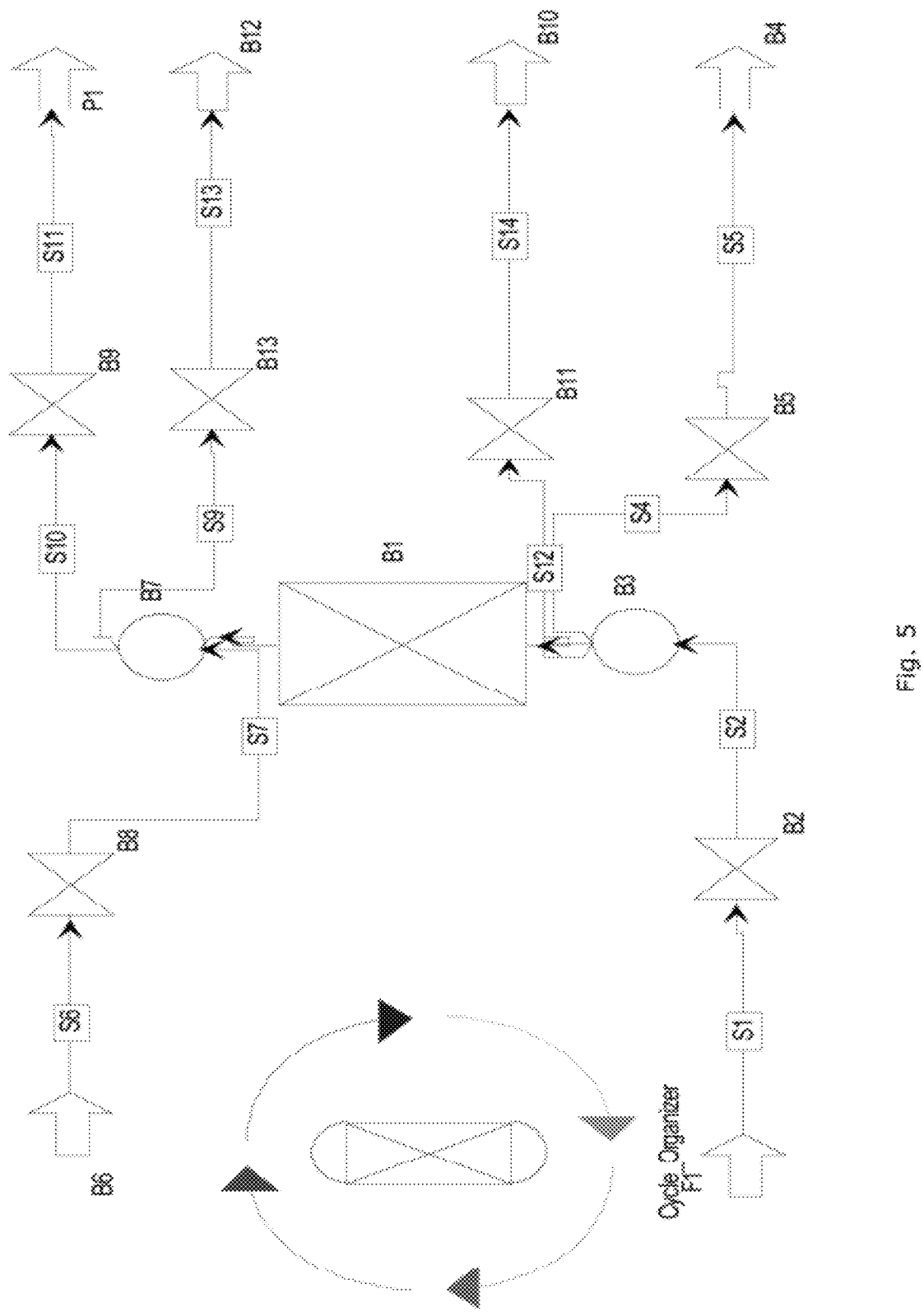
Figure 6:
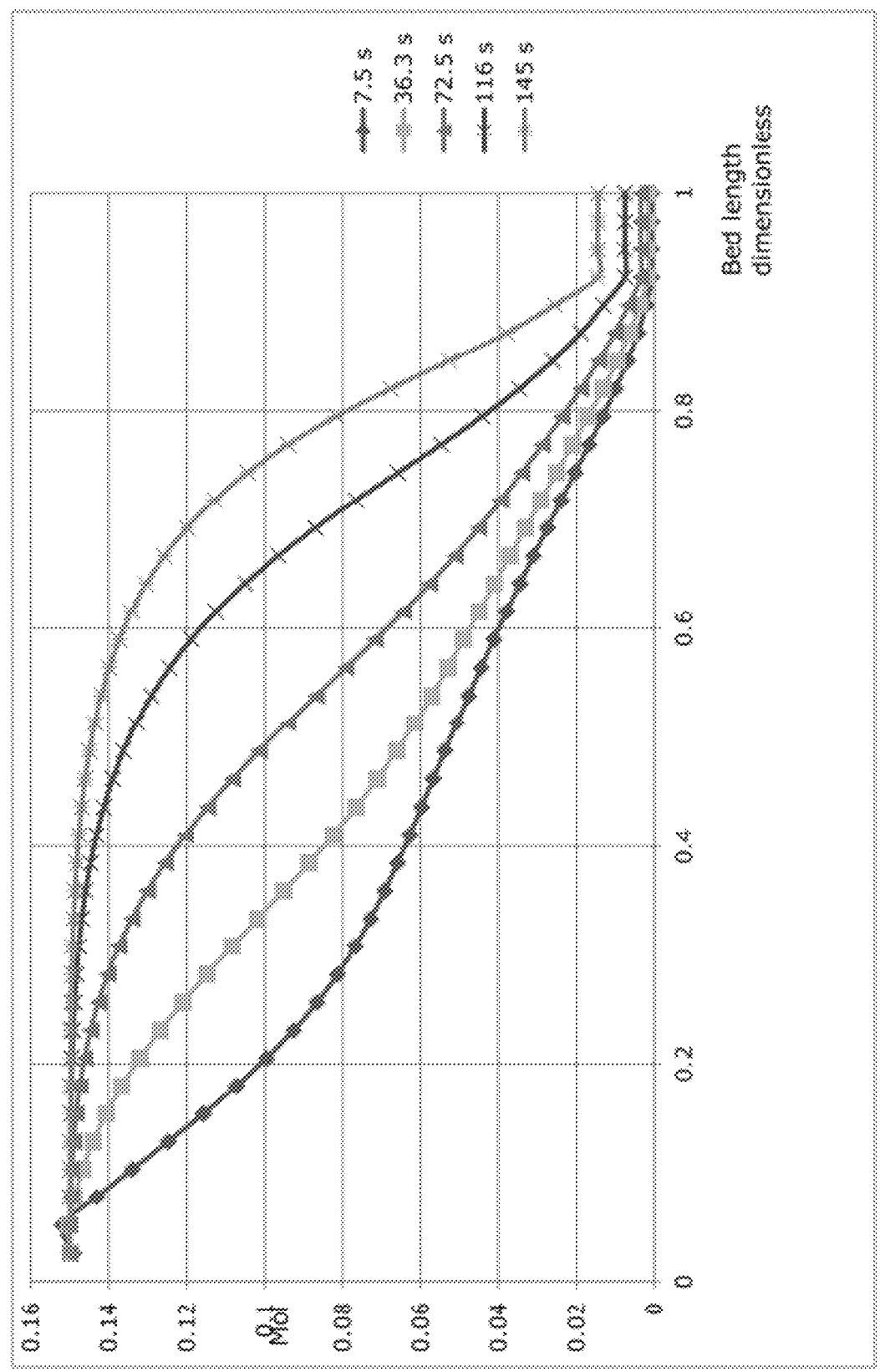
Figure 7:
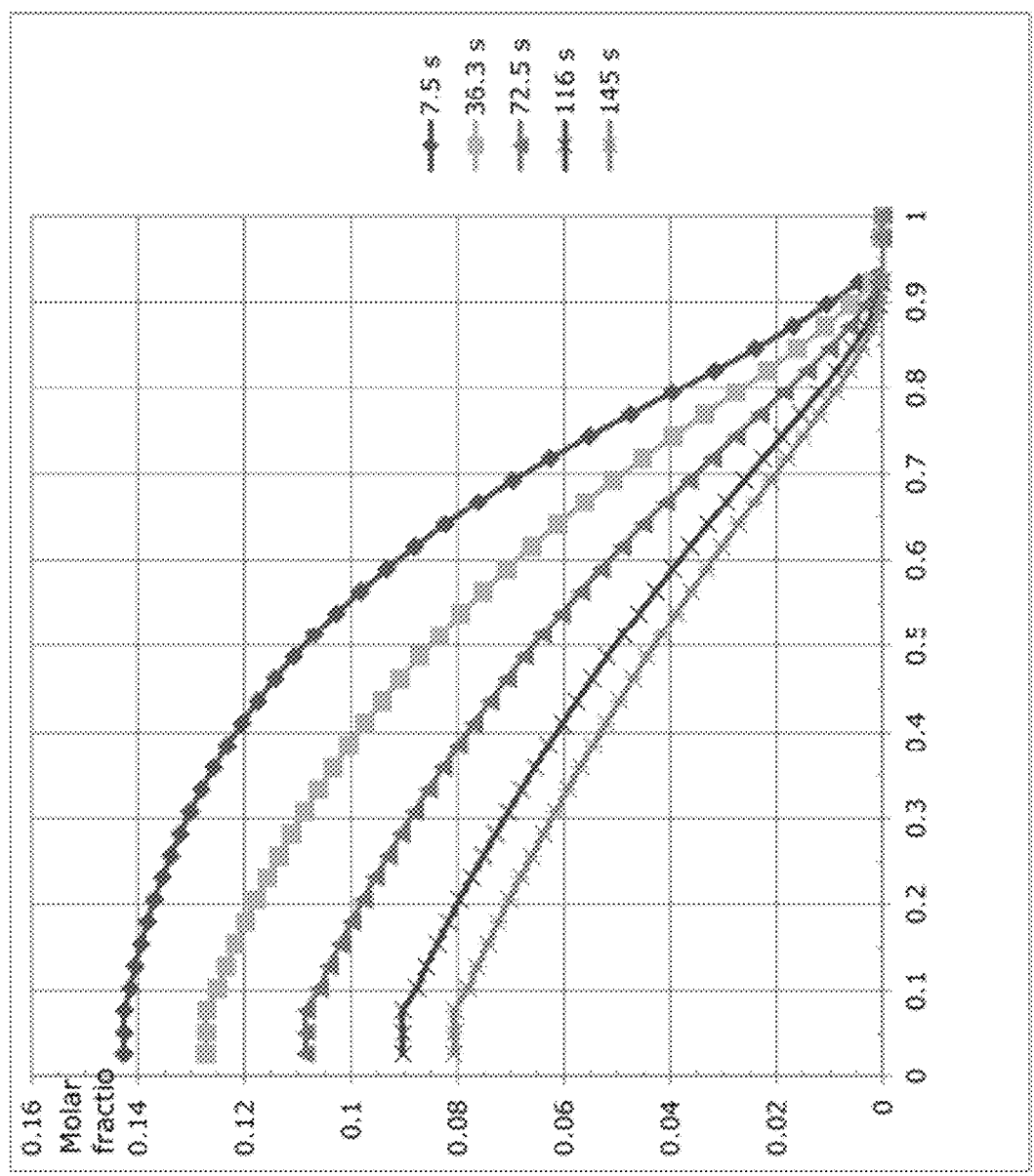
Figure 8:
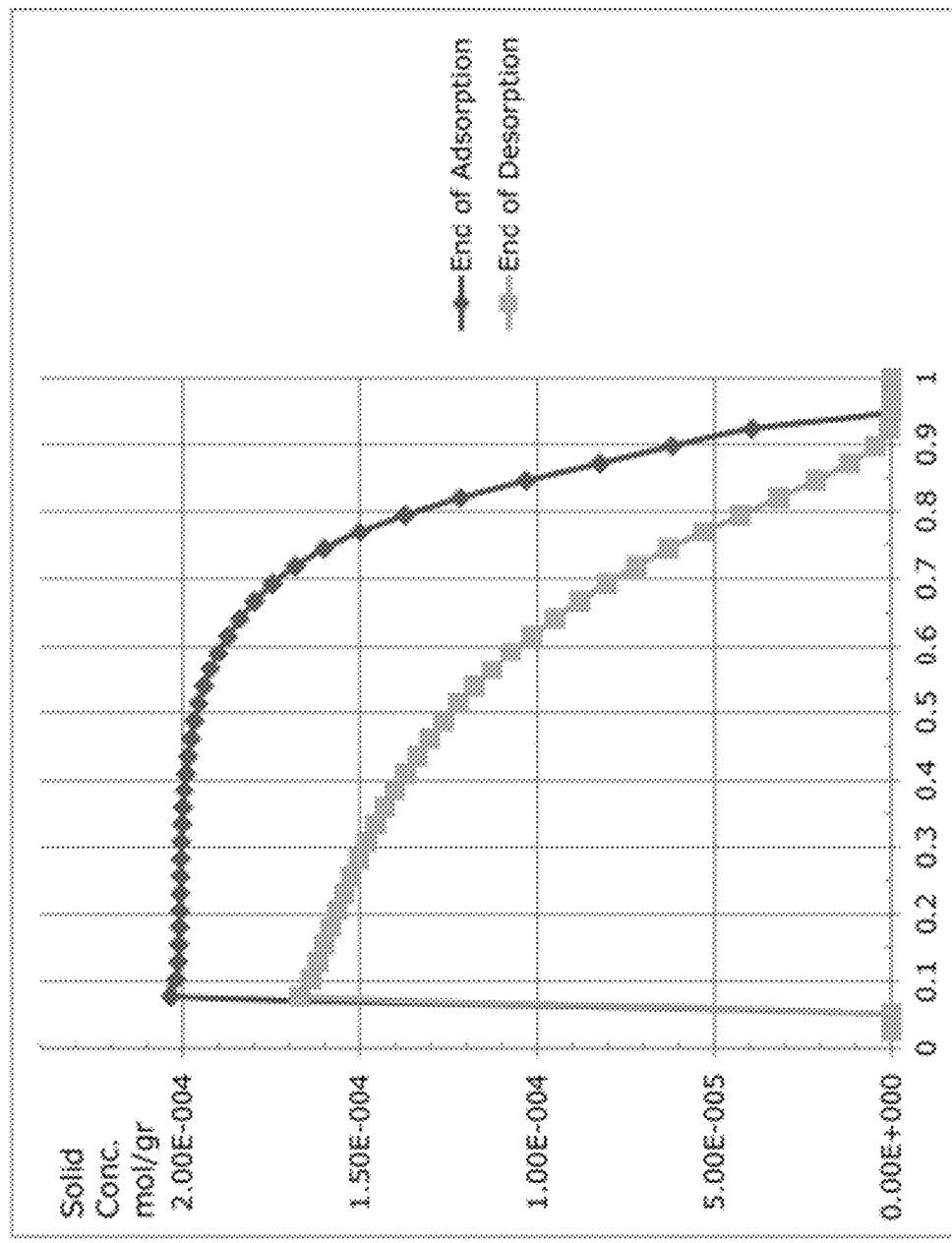
Figure 9:
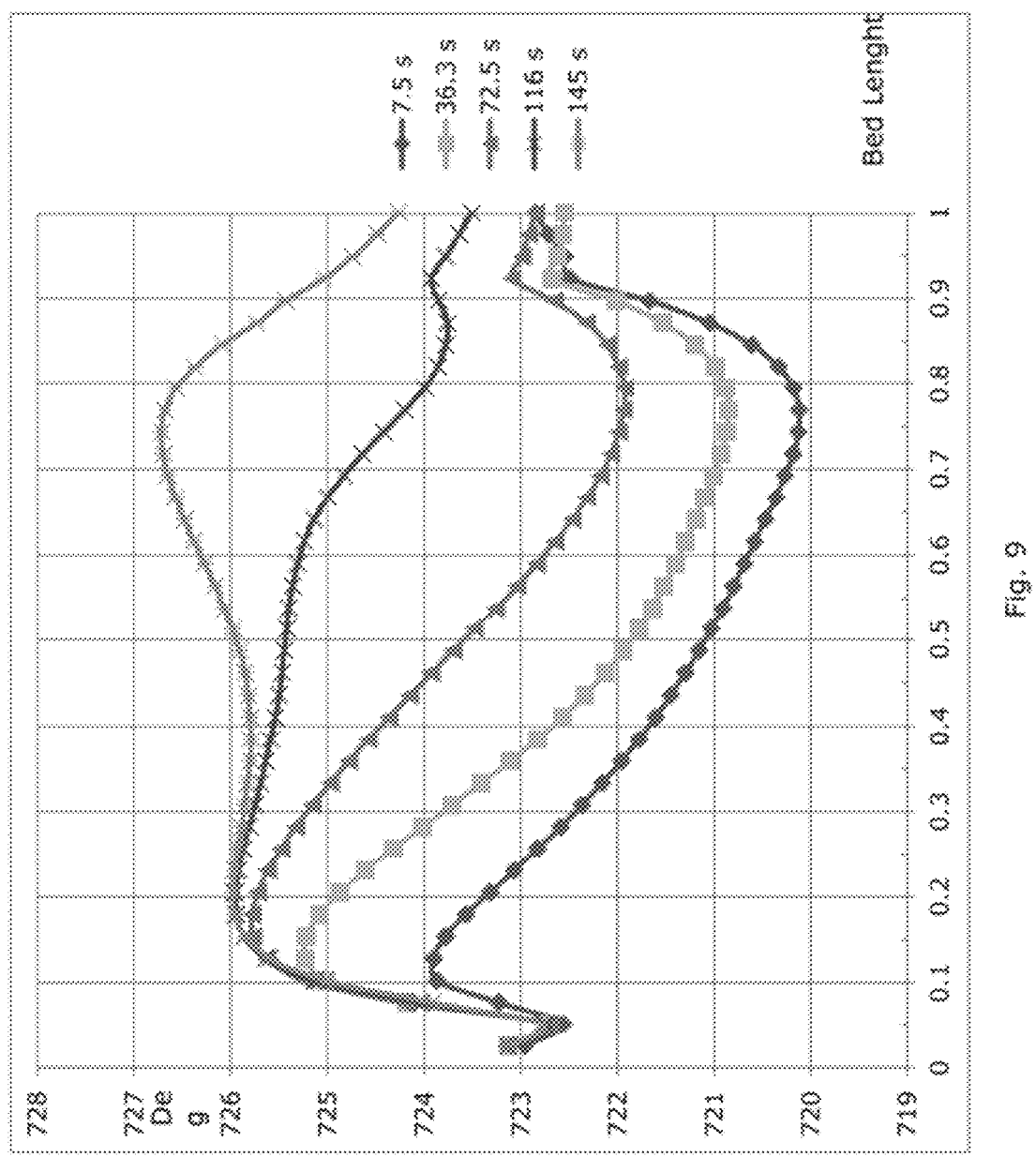
Figure 10:
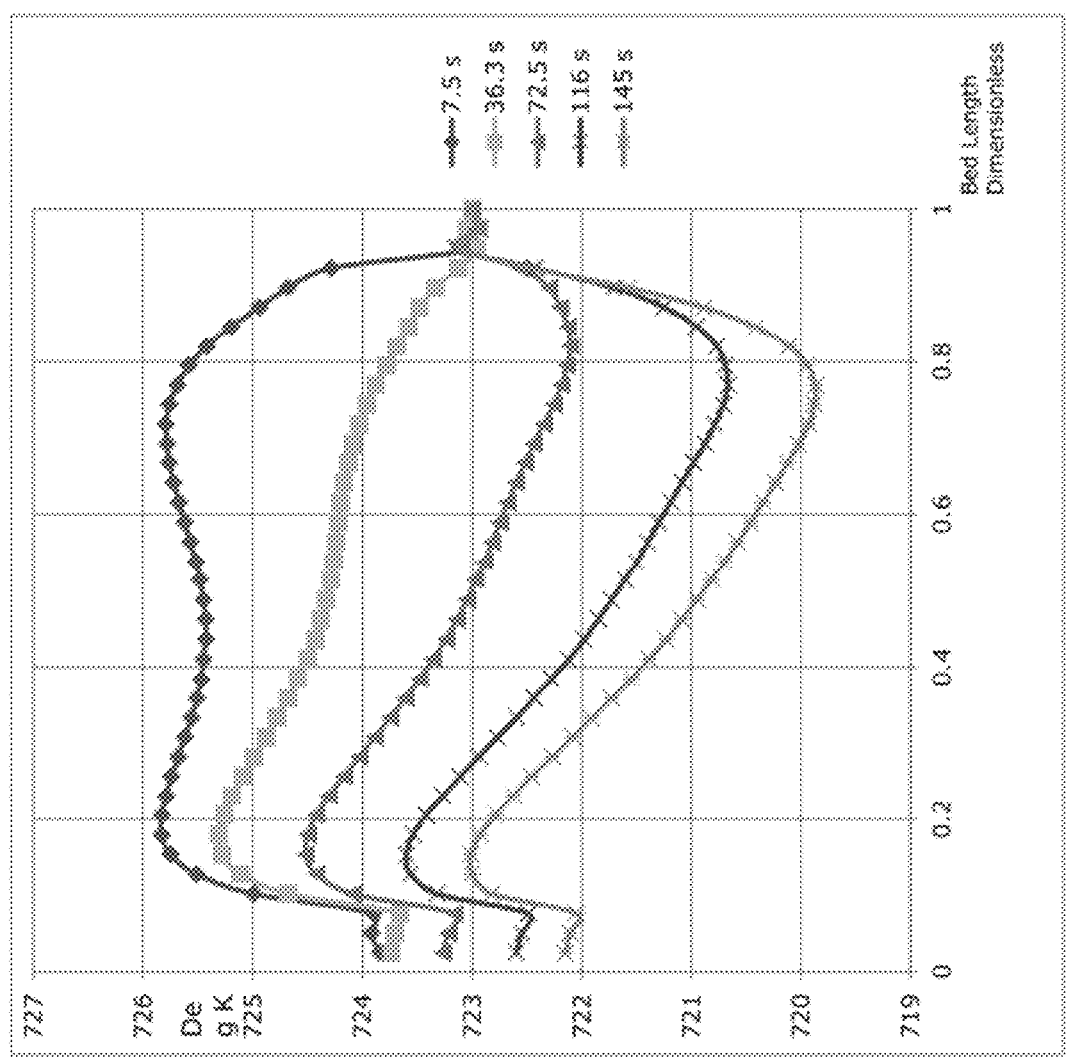
Figure 11:
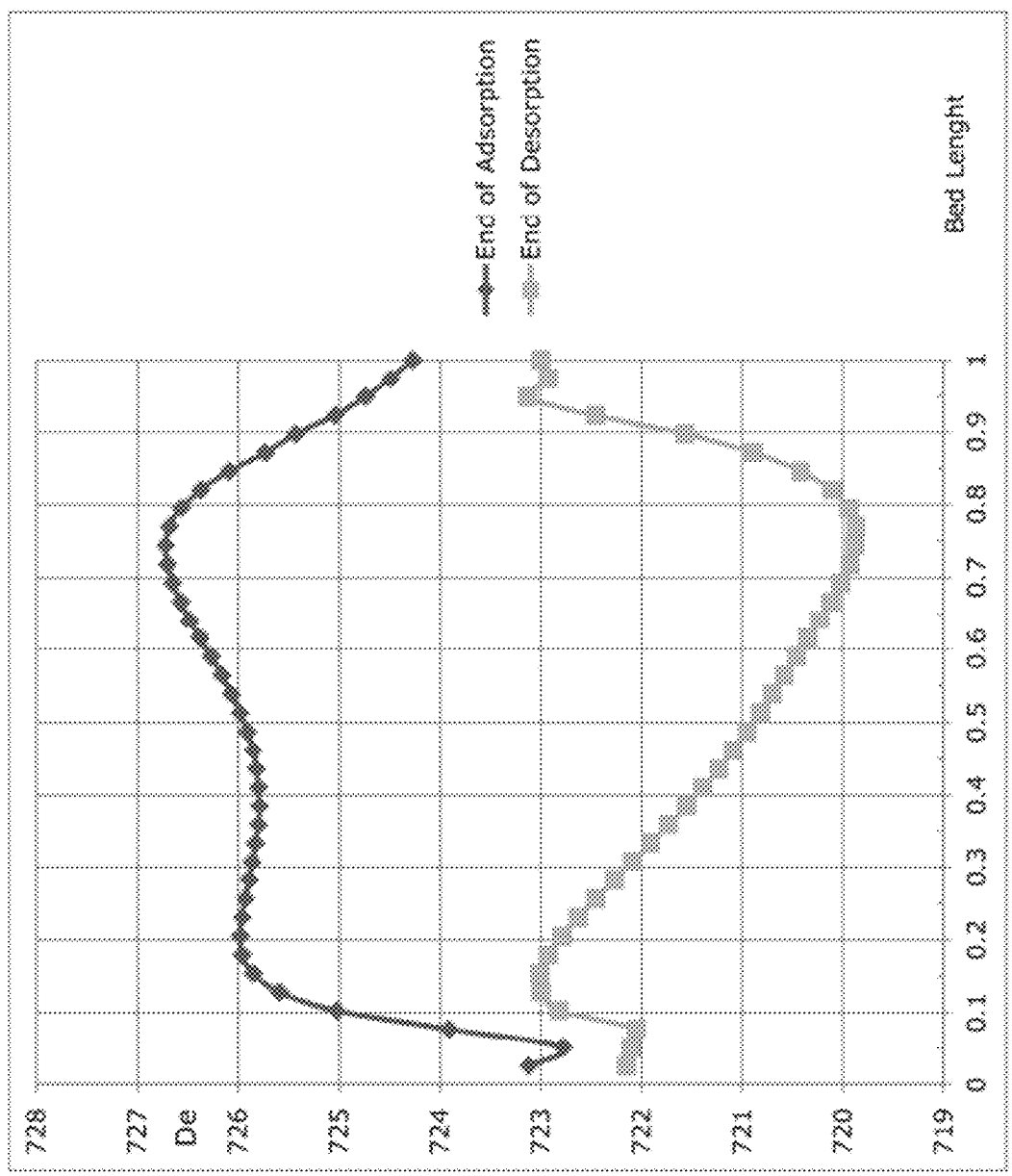

FIG. 5 is a schematic diagram showing the operation of an exemplary system in accordance with the present invention FIG. 6 is a graph illustrating the results of operation of an exemplary system and process in accordance with the present invention FIG. 7 is a graph illustrating the results of operation of an exemplary system and process in accordance with the present invention FIG. 8 is a graph illustrating the results of operation of an exemplary system and process in accordance with the present invention FIG. 9 is a graph illustrating the results of operation of an exemplary system and process in accordance with the present invention FIG. 10 is a graph illustrating the results of operation of an exemplary system and process in accordance with the present invention FIG. 11 is a graph illustrating the results of operation of an exemplary system and process in accordance with the present invention.

Figure 12:
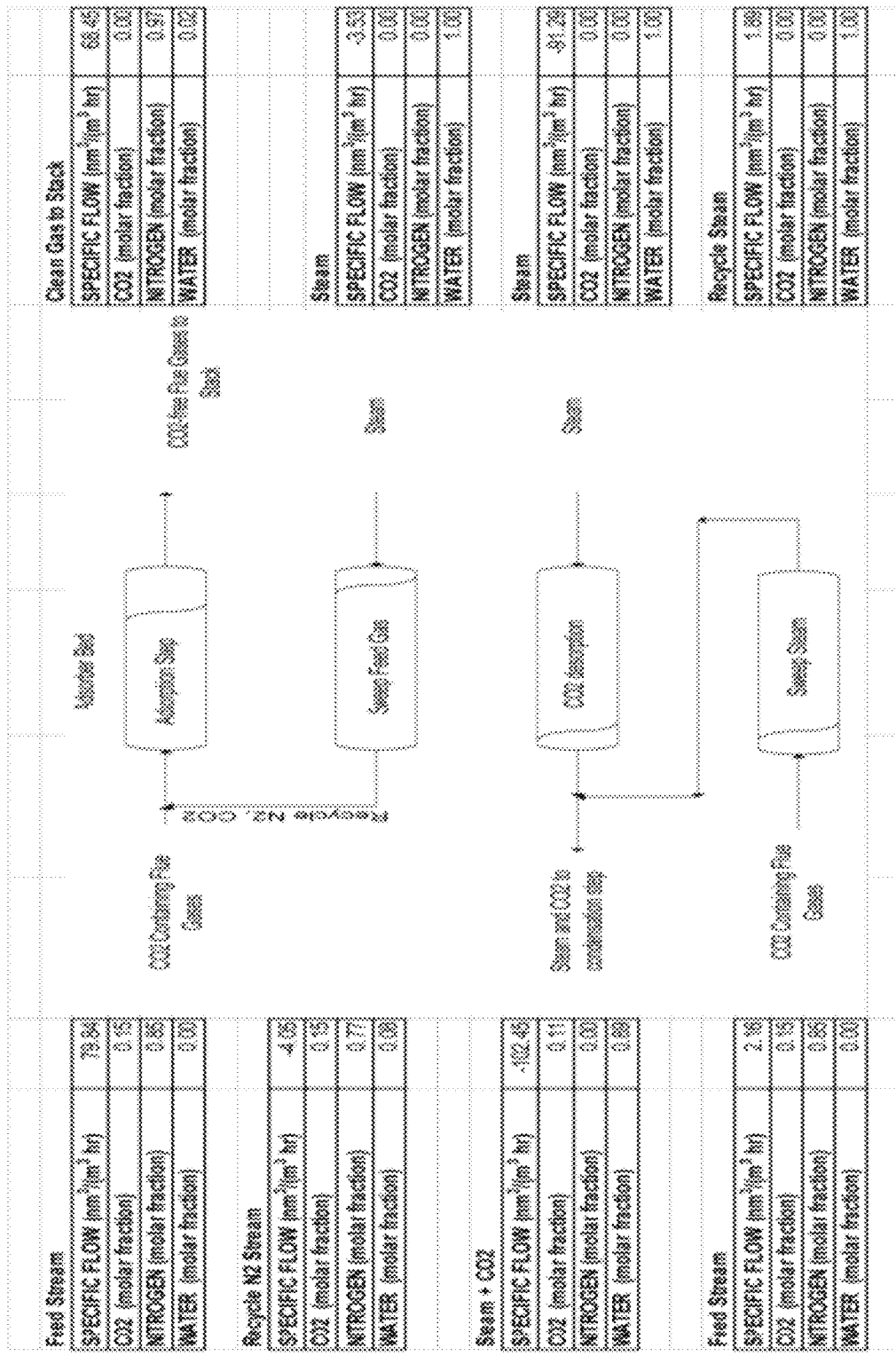

FIG. 12 is a table illustrating material balance in an example system and process in accordance with the present invention.

FIG. 13 is a table illustrating performance in an example system and process in accordance with the present invention.

Figure 14:
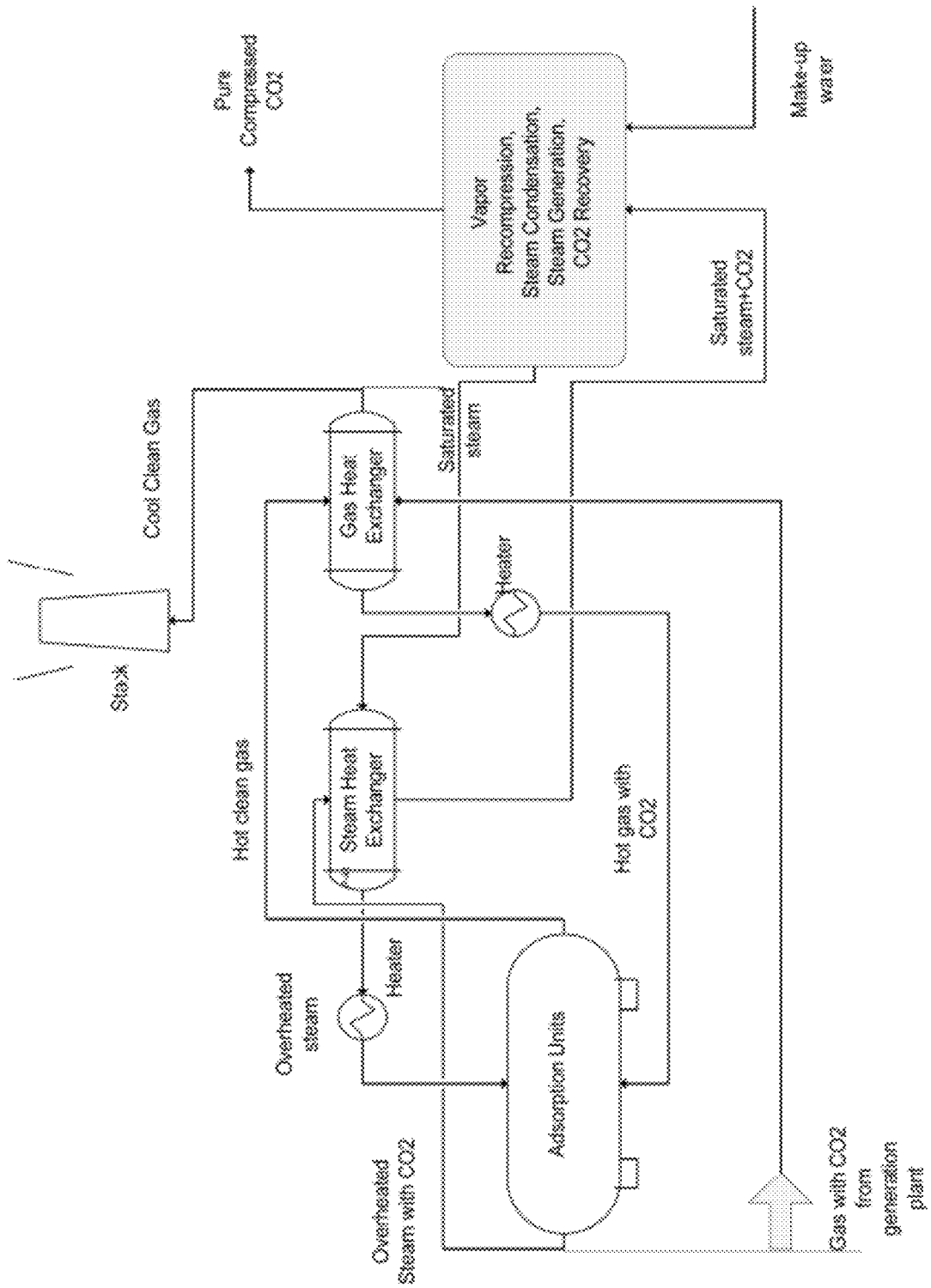

FIG. 14 is a schematic diagram showing the operation of an exemplary system in accordance with the present invention.

DETAILED DESCRIPTION OF THE PREFERRED EMBODIMENT(S)

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

Unless otherwise stated herein, any and all percentages identified in the specification, drawings and claims should be understood to be on a weight percentage basis.

Unless otherwise stated herein, any and all pressures identified in the specification, drawings and claims should be understood to mean gauge pressure.

As used in the specification and claims, the term "flow communication" is intended to mean that two or more elements are connected (either directly or indirectly) in a manner that enables fluids to flow between the elements, including connections that may contain valves, gates, or other devices that may selectively restrict fluid flow.

As used herein, the term "autothermal" as used herein is intended to means that the system and/or methods provide for effective heat recovery from within the systems and methods so that little or no additional outside heat is required once the system and/or method is initiated and reaches a steady operational state. By way of non-limiting example, a system or method can be autothermal when the only heat required to be added is compensate for small, unavoidable or impractical heat leaks. The term "heat leak" represents normal heat loss through industry equipment and insulating materials, so that "autothermal" does not necessarily require avoidance of heat loss through use of standard equipment and insulating materials.

Figure 1:
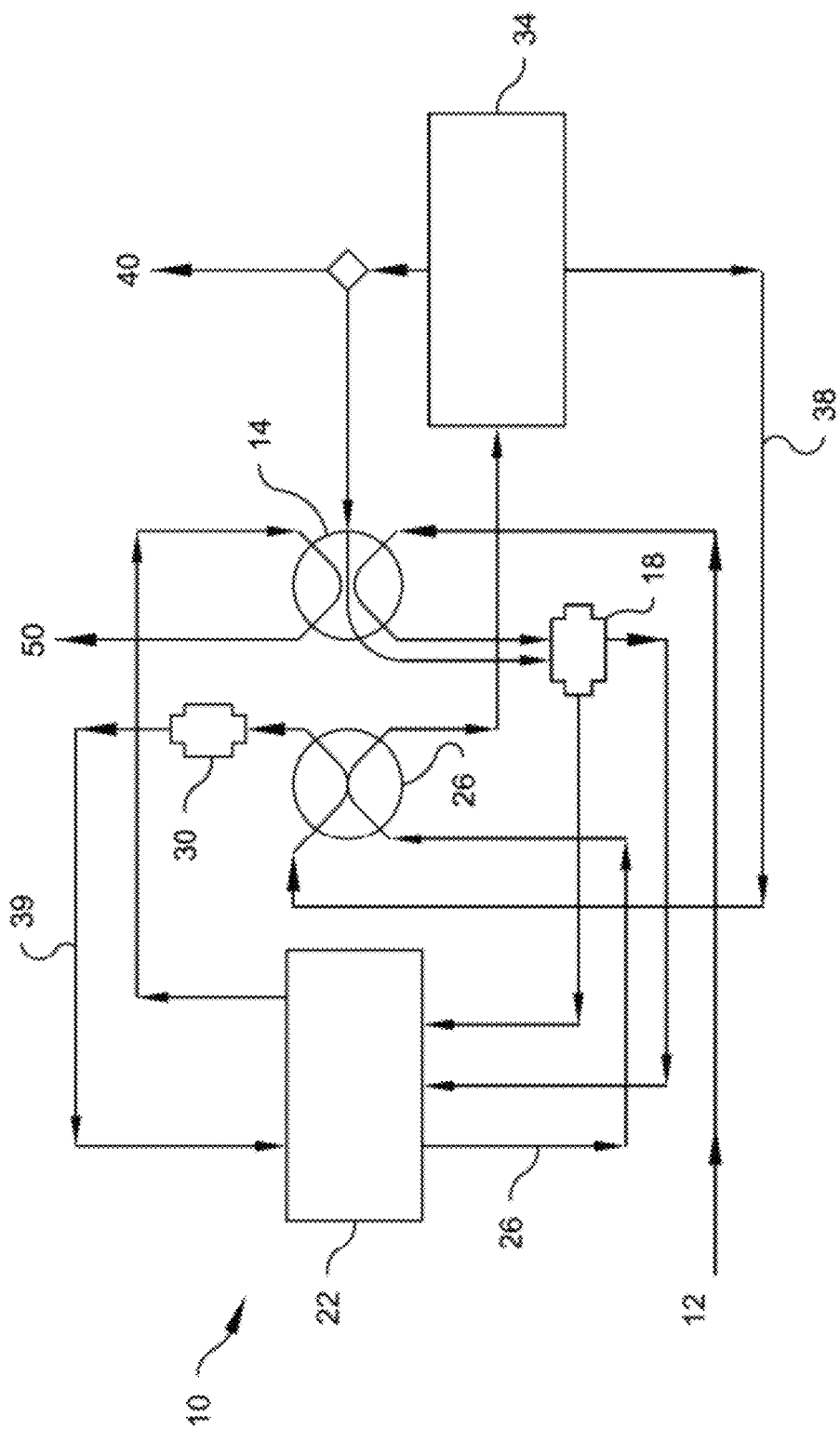
FIG. 1 is a schematic diagram of an exemplary system, further showing the operation of the system in accordance with the present invention.

Referring generally to FIG. 1, exemplary systems and methods for capturing $CO_2$ from exhaust streams are shown. As further described herein, one improvement over previous known methods is that the separation process for removing $CO_2$ in our examples operates substantially at atmospheric pressure and another novel feature is that the process operates at a particular temperature or temperature range that accommodates or preferably optimizes adsorbent performance, without the need of thermal swing regeneration. This novel elimination of the heat up and cool down periods that are required with all known systems and methods allows the inventive cycle herein to be run faster, and more efficiently than in previously known systems.

Further, in some examples herein, the heat of adsorption is used to provide the heat of regeneration. For example, the use of steam as a stream to regenerate an adsorbent has the advantage of not requiring the purity of the stream to be very high in $CO_2$. The $CO_2$ will reach high purity when the steam is later condensed in a vapor recompression process that recovers heat and water for re-use in the system, while producing a dry compressed stream of $CO_2$ gas. Further, in some examples herein, steam is not required to provide heat to the adsorber beds.

In some embodiments herein, a stream of exhaust gas from a power plant is raised to a preselected, preferably optimized temperature of the adsorption or chemisorption by exchanging heat with a purified stream returning from the adsorber unit. The heated stream is passed through an adsorber bed containing an adsorbent or chemisorbent material. At the end of the step, a stream containing higher purity $CO_2$ (95 to 99%) is used as a reflux in the same direction as the exhaust gas, until most of the inert or atmospheric gases are removed and just before the higher purity $CO_2$ breakthrough from the adsorber.

The reflux step is completed by countercurrently passing steam at the nominal temperature of the adsorber bed to desorb the $CO_2$. Steam is being produced at atmospheric pressure in the $CO_2$ recovery part of the process and is being heated to the working temperature by heat exchange with the steam now containing $CO_2$ that is exiting the adsorber bed.

In some examples, the adsorber bed is composed of an external vessel, which can optionally include internal insulation. While any adsorbent can be used, particulate adsorbents are preferred due to the large surface area they provide. For example, the vessel can contain the particular adsorbent material in the form of beads, spheres, or other substantially non-abrasive particulate shapes. Alternatively, the adsorber bed can be composed of monolith wheels containing the desired adsorbent material. Another alternative is to use rotary wheels for both the adsorption and heat exchange functions.

Adsorbent materials for use with the systems and methods herein process can be selected from a large variety of choices, provided that the material is able to operate in steam at high temperature. Materials such as activated carbon, impregnated activated carbons, activated alumina and alumina impregnated with sodium or sodium carbonate are examples of adsorbents that can be used in this invention.

The optimal temperature of operation of the autothermal, isothermal, atmospheric pressure process depends very much on the adsorbent material. In our work with sodium hydroxide-impregnated activated alumina, we have found the optimal temperature in the order of 450 degrees C., but there also exist appropriate $CO_2$ selective adsorbents able to operate at much lower temperatures, as low as around 150 degrees C.

Preferably, the recovery and concentration of $CO_2$ in the vapor recompression systems herein is performed so as to recover as much of the latent heat of vaporization of the steam as possible. For example, to generate a counter current steam stream that is used to desorb the $CO_2$ from the solid-state adsorbent. Steam has the advantage that is not adsorbed and can be easily separated from the $CO_2$ by condensation, such as in a vapor recompression system hereof. The disadvantage of steam is its high heat of vaporization/condensation. Direct recovery of the heat condensation is not possible because the steam has been diluted by stripped $CO_2$ and will condense at a lower temperature than the pure steam.

Our inventive systems and methods therefore use vapor recompression to elevate the condensation temperature of the steam. Preferably, the vapor recompression generates most, if not all, the steam needed for regeneration. In exemplary calculations, such as those described below, the theoretical minimum amount of work to be used is obtained by isothermally compressing the vapor stream as the condensate is continuously removed. This is thermodynamically equivalent to reversibly separate the two streams and will require the minimum separation work with no entropy generation. If that is impractical, our process will use single or multiple stage adiabatic compression with intermediate condensation/steam generation. Vapor recompression is a well known technology that has been applied in large scale. Axial compressors are widely used and are very efficient. However, our proposal that such axial compressors be directly driven by power plant steam avoids the losses associated with the intermediate conversion to electricity.

In the Example of FIG. 1, an exemplary system and accompanying methods are illustrated. As shown, the system 10 provides for the fluid movement of an exhaust gas 12 containing $CO_2$, such as the hot exhaust gas 12 of a coal fired electrical generation facility (not shown). The exhaust gas 12 from such a facility is typically vented at a temperature of more than 300 degrees C. and up to about 1000 degrees C. Our system 10 makes use of that high temperature by capturing the heat and re-using it at key stages. At the end of our system and methods operation, the products include a pure CO2 gas stream 40, and a cleaned gas stream 50 that is almost completely free of $CO_2$. Other products and by-products include heat and water, which are re-used in the systems herein to provide an autothermal system and process, as well as the elimination of a chiller or other wasteful venting apparatus.

As shown in FIG. 1, the capture and use of the heat from exhaust gas 12 is enabled by a gas heat exchanger 14, which is in thermal communication with the hot exhaust gas 12 from the combustion source (not shown). Heat removed by the gas heat exchanger 14 is re-used, and may be directly conveyed from gas heat exchanger 14, or optionally stored in a heater 18 where necessary until required by another component or process within the system 10. The gas heat exchanger is also in thermal communication with a vapor recompression apparatus 34, so that heat from the apparatus 34 can be conveyed through gas heat exchanger 14 to heater 18. Thus, gas heat exchanger 18 gathers heat from at least two sources: the exhaust gas 12, and the vapor recompression apparatus 34. Optionally, in some examples, the gas heat exchanger maybe in thermal communication with a steam heat exchanger 26.

In this example, heater 18 includes one or more dedicated valves and associated conduits to permit the fluid communication of the exhaust gas 12 received from gas heat exchanger 14 there through, and is selectively operable to convey the exhaust gas 12 to an adsorber bed 22. The heater 18 is also in thermal communication with the adsorber bed 22. As shown in FIG. 1, the heater 18 is further in fluid communication with the vapor recompression apparatus 34, such as through one or more dedicated valves and associated conduits to permit fluid communication of steam from vapor recompression apparatus 34 there through, and is selectively operable to convey the steam to adsorber bed 22, such as during a reflux step as described herein.

In the example of FIG. 1, adsorber bed 22 receives exhaust gas 12 for processing during normal adsorbing mode, wherein adsorbent and/or chemisorbent captures all or nearly all $CO_2$ from exhaust gas 12. The cleaned gas 50 passes from adsorbent bed 22 for further processing. In this example, the cleaned gas 50 passes through the gas heat exchanger 14 for cooling before leaving system 10, such as by venting to the outside environment, recapturing for use, or otherwise. Depending upon the temperature of the cleaned gas 50, it may be placed in thermal communication with another component of system 10 to shed heat, such as steam heat exchanger 26, for example.

During normal CO2 removal operations, CO2 remains captured in the adsorbent of adsorber bed 22. However, as the amount of captured $CO_2$ reaches a predetermined point, such as more than about 85% of the bed capacity, a process is required to release the $CO_2$ and restore the capacity of the adsorbent. In the example of FIG. 1, heater 18 and adsorbent bed 22 include features to commence and maintain a purge and recharge process to accomplish the removal of captured CO2 from the adsorbent. For example, when a pre-set capacity is reached (as determined by detectors, sensors, controllers, or other apparatus known in the field), system 10 initiates a reflux cycle. During this cycle, steam is generated and conveyed into adsorber bed 22 to remove captured $CO_2$. For example, steam can be generated using the heat captured by other system 10 components, such as gas heat exchanger 14, vapor recompression apparatus 34, steam heat exchanger 26, and adsorber bed 22, and any combination thereof. In the example of FIG. 1, heater 18 conveys heat to the adsorber bed 22, along with steam from vapor recompression apparatus 34 that is super heated by gas heat exchanger 14, and optionally by steam heat exchanger 26. The super-heated steam passes through adsorbent bed 22, exiting as steam with liberated $CO_2$. The stream 26 of steam and $CO_2$ is in thermal connection with steam heat exchanger 26, and in fluid communication with vapor recompression apparatus 34.

Vapor recompression apparatus 34 is in fluid communication with stream 16, and also with steam heat exchanger 26, and optionally with a second heater 30. Notably, apparatus 34 includes an outlet for conveying a stream 40 of $CO_2$ (preferably pure $CO_2$) from the system 10, such as to a downstream compressor, storage vessel, or otherwise. Apparatus 34 includes a compressor, such as an axial compressor, for compressing a gas stream generated by the systems and methods herein.

Optionally, a second heater 30 is in thermal communication with steam heat exchanger 26, and optionally with adsorbent bed 22. Second heater 30 is in fluid communication with steam generated by vapor recompression apparatus 34 and steam heat exchanger 26 for receiving of generated steam 38, and for further heating steam 38, preferably to a temperature of between about 100 degrees C. to about 500 degrees C. before selectively conveying superheated steam 39 to adsorbent bed 22, such as during a reflux or other $CO_2$ purge of adsorbent bed 22.

Vapor recompression for $CO_2$ recovery and heat of condensation recovery. Recompression and associated calculations. The inventors have discovered that it is possible to use vapor recompression to recover the heat of condensation of the vapor used for stripping and produce fresh stripping vapor. To accomplish this in a predictable manner, the inventors have developed and applied methods and formulae that are instructive concerning the variables involved. For example, the adsorber produces a steam-$CO_2$ mixture with a $CO_2$ mol fraction xf, at a total pressure pf (kPa) and a temperature tf (° C.), wherein xf:=0.15, pf:=10. A tf:=10 compressor exit pressure pout (kPa) must be chosen together with the condensation temperature tc (° C.): pout:=250, tc:=106.

The steam and CO2 separation process and systems. This section is concerned about the work needed for recovery from steam-$CO_2$. The process consists of two stages:

Effect of the amount of stripping steam in a preferred embodiment of $CO_2$ and steam separation.

The first stage, discussed in the previous section is the separation of $CO_2$ using rapid switching (e.g. 300 sec total cycle time) of counter flowing flue gas and steam in an adsorption vessel at constant pressure and temperature. The second stage uses vapor recompression to recover the heat of condensation of the steam, eliminate the addition of external steam, and separate the mixture of CO2-steam by condensation of the water vapor.

For the first stage and for ideal conditions, a large bed (no mass transfer limitations and no mass transfer zone), ideal gas and no accumulation in the interstitial volume, the performance of will depend on the relative molar flows of inert (mostly nitrogen and excess oxygen) in the flue gas, $N_i$, and steam, Ns.

By analogy with heat exchangers it is expected that if the flow of inert exceeds the flow of steam, Ni>Ns, the exit mol fraction of CO2 in the steam will be equal to the entrance composition of flue gas. At the other end of the bed the exit composition of the flue gas will be determined by a $CO_2$ balance. For a low value of the steam flow, the purified flue gas will not meet the $CO_2$ removal specifications, such as 90% capture.

In the case where the flow of steam is larger than the flow of inert, Ni<Ns, all of the $CO_2$ could be removed from the flue gas and the composition of the steam phase will be determined by a $CO_2$ balance. If Ni=Ns, all of the $CO_2$ could be removed from the flue gas and the mol fraction of the $CO_2$ in the product steam will be identical to that of the entering flue gas if perfect breakthrough and no mass transfer zone is observed.

Only in the case Ni=Ns will be no entropy generation, and in the case Ni<Ns, the $CO_2$ will be diluted in the steam requiring additional work of separation. Since, in most cases, the operation may require an excess of steam it is of interest to determine the effect of dilution on the minimum, reversible, work required for separation. No process improvement in the will reduce the necessary work below this desired minimum.

Minimum work of separation The minimum separation work for an ideal gas mixture producing pure $CO_2$ and pure steam, per unit of carbon, is given by:

$$\frac{W}{RT} = \frac{x\ln(x) + (1-x)\ln(1-x)}{x} \quad (a)$$

The ratio of the minimum work for a given exit concentration x to the minimum work with the reversible value for $x_0$ the mol fraction in the flue gas, RelWork(x,$x_0$), is shown in figure A.

Relative values of minimum work required for the $CO_2$-steam separation for different mol fractions $x_0$ of $CO_2$ in the original flue gas ($x_0$=0.15, 0.1, 0.08 and 0.04). Only the values corresponding to x<$x_0$ are meaningful.

For the case where $x_0$=0.12, the average concentration in the product steam is x=0.10885, and the relative increase is 12.2% in the minimum work required.

Actual minimum work as given by equation (a) is 0.223 GJ/ton $CO_2$ (9.805 kcal/mol $CO_2$). Since steam at atmospheric pressure is the desired product, the separation must be carried out at 100° C. This carries a penalty when compared with the separation at room temperature (40° C.) of an additional (373K-313K)/313K~19%, but it is an unavoidable consequence of the use of steam.

Heat recovery and vapor recompression: Evaluation of the recovery options requires establishing a correspondence between heat and work. Like done by Oyeneke and Rochelle (2007) a modified Carnot efficiency is used to establish the equivalence between heat and work as given by:

$$W_{eq} = 0.75Q\left(\frac{T-T_0}{T}\right)$$

Where T is the temperature at which the heat is exchanged and $T_0$ is the available ambient temperature.

$CO_2$ recovery by direct steam condensation: The simplest technological approach is separation of the steam by condensation at ambient temperature. This will produce a stream of nearly pure $CO_2$ at atmospheric pressure. There will be limited heat recovery since the condensation temperature of the diluted steam will be below the boiling point of pure water (for 11%, 96° C., and decreasing as the condensation progresses). To produce saturated steam (heat of vaporization 2256 kJ/kg steam) at 1 atm and using a temperature differential across the evaporator of 5° C. will require 7556 kJ/kg steam, equivalent to 1200 kJ/kg steam of equivalent work. This corresponds, for a steam content of 3.349 kg steam/kg $CO_2$ to 40.172 kJ/mol of $CO_2$ This does not include the cost of compressing the $CO_2$ to a pipeline pressure of 100 bar and will be, probably, uneconomical.

Minimum work required for vapor recompression and steam generation: Ideally, the minimum work could be used to provide a stream of pure steam that would be recycled into the process, thus not requiring external supply of steam. A first approximation to the separation is obtained by isothermal compression of the $CO_2$-steam product stream from the adsorber to condense the steam at 100° C., separating the liquid and generating an identical amount of steam at the same temperature. There will be no entropy generation since the heat transfer is done without any temperature difference. The equilibrium steam mol fraction at a total pressure Pt and temperature T will be given by $P^{sat}$(T)/Pt, where $P^{sat}$(T) is the saturation temperature at T. The process will produce a stream of high pressure $CO_2$. Not all of the steam will need to be condensed during compression to generate the desired amount of steam, since part of the steam will be generated by the heat released during the isothermal compression (i.e. the work of compression converted into heat will be used to generate steam). It is necessary to calculate the work needed for the isothermal compression. The amount of steam generated by condensation is given by the following discussion.

If y is the initial mol fraction of $CO_2$, the amount of steam condensed, and generated, per mole of $CO_2$ after compression to a total pressure Pt will be:

$$m_{cond} = \frac{1-y}{y} - \frac{\frac{P^{sat}}{Pt}}{1 - \frac{P^{sat}}{Pt}}$$

The rest of the heat required for the evaporation can be obtained from the isothermal work of compression. This can be calculated from the change in the free energy of the mixture. Work will be required to compress the steam to its saturation pressure at the condenser temperature. Further increases of the mixture temperature will not change the partial pressure of the steam and its partial free energy. The corresponding work per mole of $CO_2$ will be:

$$W_{st} = \left(RT\ln\left(\frac{P^{sat}}{P_{in}(1-y)}\right)\right)\left(\frac{1-y}{y}\right)$$

The corresponding work for the $CO_2$ is:

$$W_{CO_2} = RT\ln\left(\frac{Pt - P^{sat}}{P_{in}y}\right)$$

The total amount of steam generated is now a function of the final pressure and is given by:

$$m_{ev}(Pt) = m_{cond} + \left(\frac{W_{st} + W_{CO_2}}{\Delta H_v}\right)$$

Where $\Delta H_v$, is the heat of vaporization of steam, assuming that liquid water is available preheated to the evaporation temperature (100° C. in example, $\Delta H_v$=2269 kJ/kg=40.624 kJ/mol). For an initial mol fraction y=0.10885 (8.187 mol steam/mol $CO_2$), and an initial pressure of 101 kPa, yields by trial and error a final pressure of 410 kPa and a minimum work of 13.271 kJ/mol $CO_2$. This is different of the minimum work of separation since the products of are also different.

Power required for vapor recompression, steam generation and CO2 concentration. In practice, a series of adiabatic compressors with intermediate cooling by evaporation will be used. The total power will depend of the final pressure, the number of compressors, intermediate pressures, the compressor efficiencies and the inter-stage condensation temperature. The condensation temperature should also be higher than the evaporation temperature. Given the large number of variables to be considered, only the example discussed above will be presented. The final pressure has been chosen to provide the necessary amount of steam, so no external steam is to be provided. For the case of n compressors the pressure ratios in each compressor have been chosen as the harmonic ratios between the final and initial pressures $(P_{final}/P_{initial})^{1/n}$. While this is the criteria used in the compression of non condensable gases, it may not be the optimal choice for this process that includes vapor condensation. Compressor powers for 1, 2 and 4 compressors for two efficiencies (1, 0.8) and condensation temperatures (100, 106° C.) are shown in figure B, while the total power required to compress the $CO_2$ to 10 MPa is given in figure C. The individual compressor powers, total compressor work, additional power to compress the $CO_2$ to 10 MPa, and total power required are shown in Table 1 and the intermediate pressures and heat exchanged in each condenser, together with the compression power to 10 MPa and other data are given in table 2.

The figures and tables also show the equivalent Carnot work when all of the steam is condensed (40.172 kJ/mol $CO_2$), the ideal separation work (9.805 kJ/mol $CO_2$) and the work when ideal compression-condensation is used (13.270 kJ/mol). The last two are very different because the exit pressure of the condensation evaporation is 4.1 bar and not 1.01 bar as in the ideal gas separation. When the total work to 10 MPa is considered the required work for isothermal separation of the gases and isothermal vapor recompression for condensation is essentially the same. The two non-idealities expected are a higher condensation temperature than that of steam at 1.01 bar and the lower adiabatic efficiency of the compressors. The effect of them in the work necessary to generate the desired amount of steam is shown in figure XX. The work decreases with an increase in the number of compressors, from 1 to 4, increases with a decrease in efficiency, from 1 to 0.8 and with an increase in the condensation temperature, from 100° C. to 106° C.

The work necessary to take the $CO_2$ to a final pressure of 10 MPa is given in Table 1 and is calculated assuming five adiabatic compressors with intermediate cooling to 40° C. and adiabatic efficiency of 0.8. The overall work can be seen in figure C and the results are qualitatively similar to those seen in figure B.

Final pressures vary with the process used and are given in Table 2 of FIG. 13, explaining the overlap between adiabatic compression and ideal condensation.

Total compression work in the compression evaporator system for a final $CO_2$ pressure of 10 MPa. Curves are labeled with the compressor efficiency and the condensation temperature. A five adiabatic compressor train with intermediate cooling to 40° C. and efficiency of 0.8 is used. Notice that the overlap between curves has disappeared.

The calculated powers do not include the auxiliary power required to overcome the pressure drop across the beds, which may require a fan, that is expected to be small relative to the recompression power.

Discussion: The calculated energy requirements are lower than those required in the existing liquid processes but higher than projected minimum values by Rochelle (2009). The most important characteristic is that no external heat supply and removal is required. There is no solid circulation, and the solid is in bulk form. The adsorber bed operates at atmospheric pressure and constant temperature. (Except for the internal temperature increases and decreases during adsorption and desorption). There are no corrosive or toxic fluids involved.

Vapor recompression technology has been extensively applied to water desalination in a volume scale similar to the proposed process for this entirely different use. Initial calculations for the process have been carried out using sodium promoted alumina at 300° C. but the process can be carried out at lower temperatures if a low temperature, highly selective adsorbent becomes available. References: Gary T. Rochelle, "Amine Scrubbing for $CO_2$ Capture" *Science* 325, 1652 (2009); Babatunde A. Oyenekan, Gary T. Rochelle "Alternative stripper configurations for $CO_2$ capture by aqueous amines", Volume 53, Issue 12, pages 3022-3276 (2007).

Computer Simulation of the autothermal adsorption/chemisorption process. For the purpose of this research, the Adnnovate dynamic adsorption simulator developed by Dr. LaCava and co-workers (and further developed by LaCava) was utilized. Information concerning that simulator is available in several publications, which are hereby incorporated herein by reference as though fully set forth herein. The references include: 1) "Simulation of Pressure Swing Adsorption Processes", Doong, S. J. and A. I. LaCava, Adsorption News (Newsletter of the International Adsorption Society), February 1991, 2 (1), 4-6); 2) High quality adsorption equilibrium and rate expressions for the chemisorption of $CO2$ on sodium activated alumina, reported in the Ph.D. Thesis "High Temperature CO2 Chemisorbents: Applications, Characterization, and Study of the Chemical Nature of Chemisorbent Surfaces" By Michael G. Beaver, Department of Chemical Engineering, Lehigh University, September, 2010.

In this example, the simulated system and methods involved three steps: adsorption; reflux; and regeneration with overheated atmospheric steam. The study included several temperature levels, cycle times, gas flows and adsorbent types (monoliths and beads) in search for an optimal configuration for lowest energy consumption and lowest cost. The table below summarizes the results of the simulation study.

Example 2

In another example, systems and methods of operation are provided for recovery of $CO_2$ from an exhaust stream. The methods are generally illustrated in FIGS. 2-3, and as described herein.

The adsorption process proposed here is of the "purge swing adsorption" type, where the basic steps are 1) adsorption of the desired component (CO2) from the contaminated stream, releasing purified gas (N2, O2, Ar), followed by 2) regeneration with a second non-adsorbable component (in this case superheated steam) with the removal of the CO2 from the adsorbent. This basic cycle can be complemented with steps designed to increase the purity of the stream and increase the performance of the separation. The CO2 can now be easily recovered by condensation of the steam, including using the processes as described herein.

Figure 2:
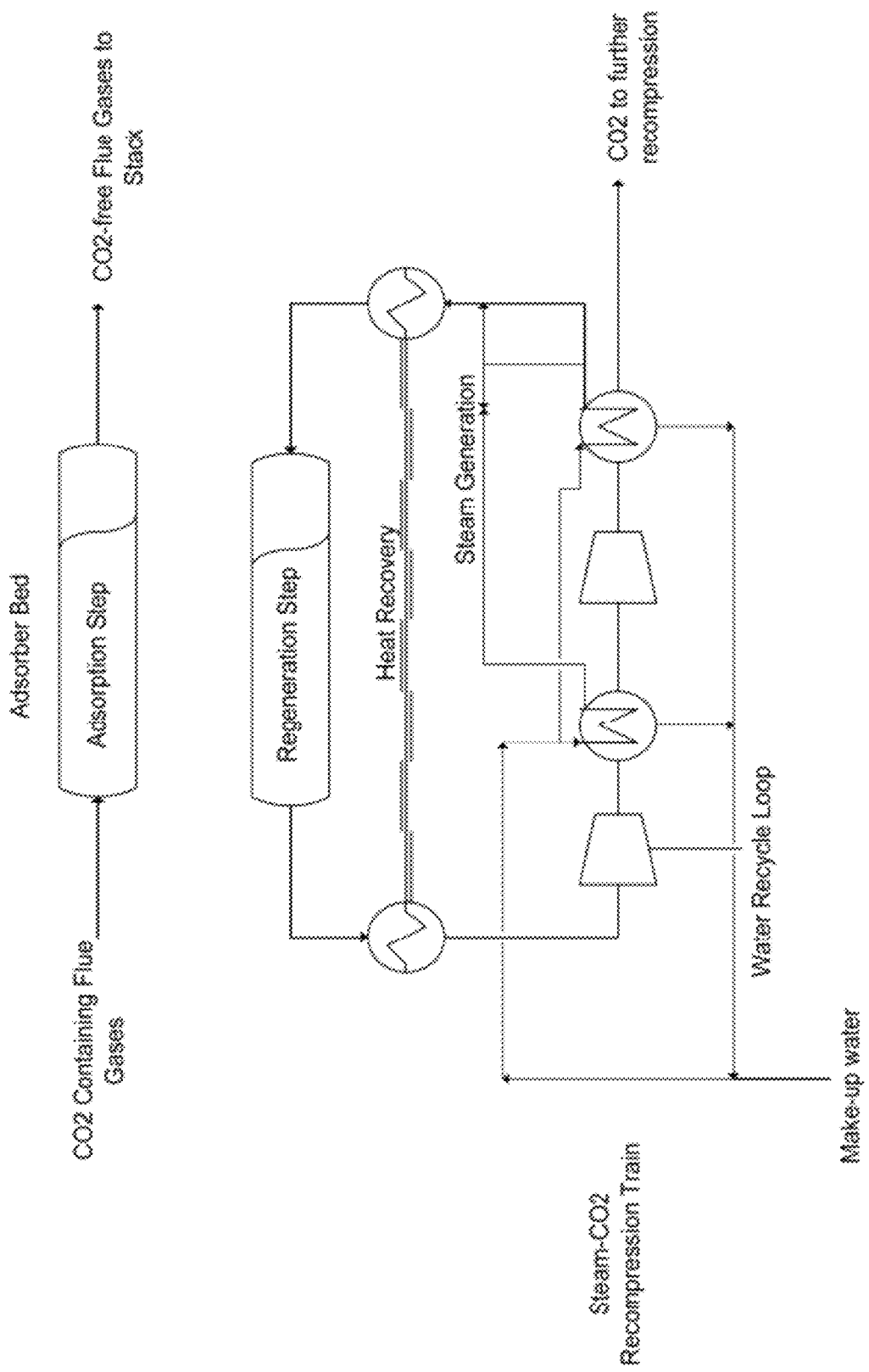
FIG. 2 is a schematic diagram of another exemplary system, further showing the operation of the system in accordance with the present invention.
Figure 3:
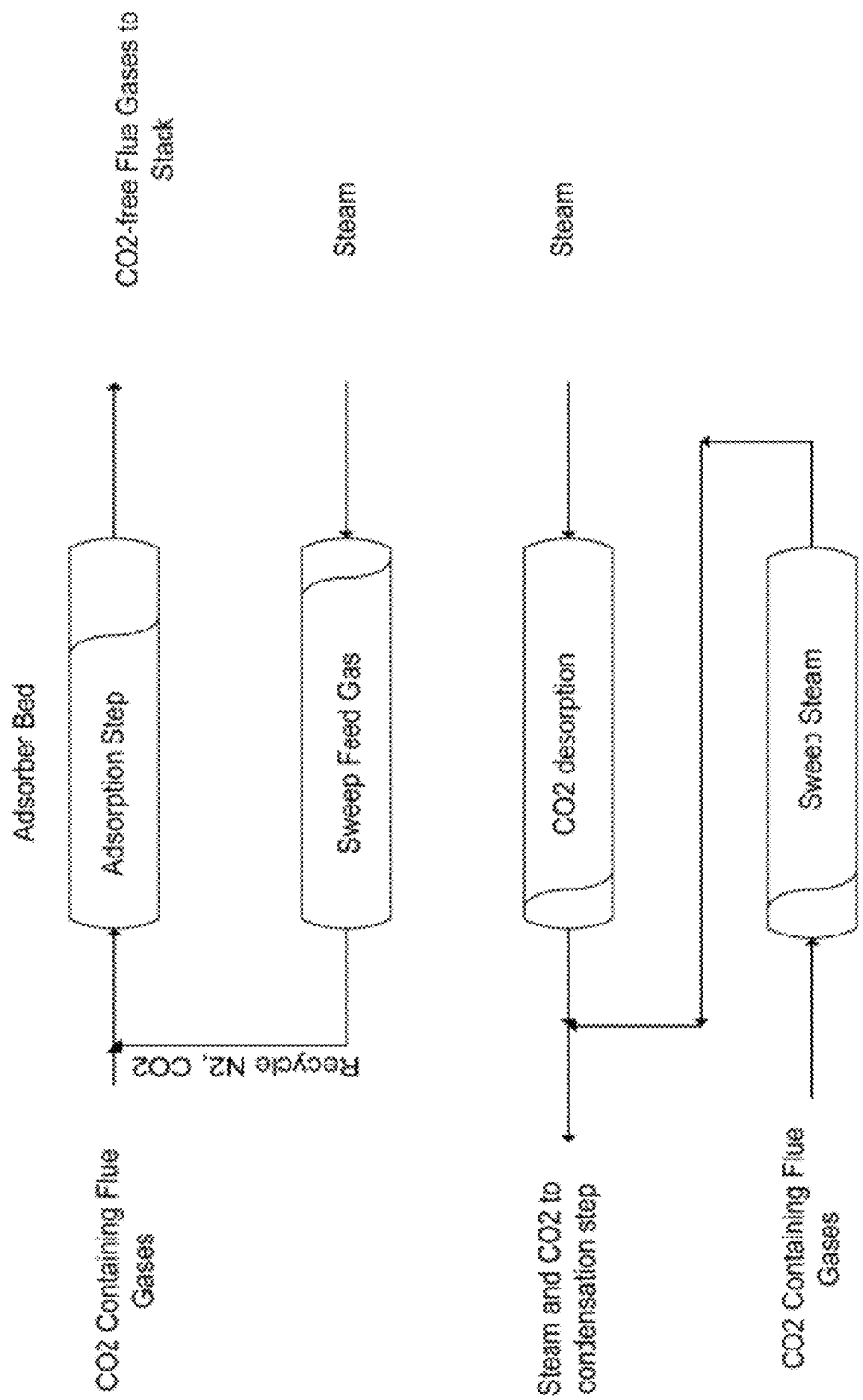
FIG. 3 is a schematic diagram showing the operation of an exemplary system in accordance with the present invention.

FIG. 2 illustrates the general scheme of the process in an embodiment, including the adsorption stage and the steam recompression/condensation to separate CO2. Two stages of compression are shown as an example only.

The adsorption stage. The adsorption stage is designed to maximize CO2 recovery and concentration in the product stream, as well as to reduce the amount of steam lost to the stack. In the process described below we will discuss each of the steps and their corresponding rationale. Note that this process is adiabatic, without heat addition/removal. There are minimal fluctuations of temperature in the bed due to heats of adsorption and desorption, but the process is essentially isothermal. Pressure changes are limited to the pressure drop across the beds. There are four well defined steps described below. Typical durations of each step as found for the example presented later in this work are given in parenthesis. FIG. 3 is generally illustrative of the adsorption cycle in an embodiment. As shown, the process of FIG. 3 includes four steps.

1—Adsorption: In this step, gas from the combustion process in the power plant is brought to the optimal temperature and fed to the adsorption bed. The purified gas stream, after a heat recovery step, is discharged into the stack.

2—Sweep feed gas step: In the second step, steam is used to sweep the interstitial spaces in the bed to remove the feed gas from the previous step. This step prevents the contamination of the $CO_2$-steam stream with N2 and $O_2$ from the feed gas. The gas from the sweep step is recycled to the feed gas input.

3—$CO_2$ desorption: Steam continues to sweep the adsorber bed, desorbing the $CO_2$. The $CO_2$-steam stream is further sent to a heat recovery step and to the steam condensation stage.

4—Sweep steam: Steam that occupies the interstitial spaces in the bed is sweep with the feed gas and mixed together with the $CO_2$-steam stream. This minimizes the steam escaping to the stack.

Steam to feed gas ratio: For an ideal purge adsorption process with no mass transfer resistance, the molar ratio of steam to feed gas should be one. When the mass transfer zone is included, higher ratios are required. The ratio is typically found experimentally or through a rigorous simulation of the different factors that affect the mass transfer zone, which include the mass transfer coefficient for adsorption and the mass axial dispersion in the bed. In the cases studied for this paper, the best ratio found was about ~1.14 to 1.16. This value changes with the operating conditions, but can be determined with reasonable experimentation by one skilled in the art.

Adsorbent material selection. The ideal adsorbent material for this process would adsorb only $CO_2$ and would not adsorb any of the other components (water, $N_2$, $O_2$). The material should also be resistant to water, sulphur compounds and other contaminants that may be present during combustion.

There are few solid-state $CO_2$ selective adsorbents that would not adsorb water, even at high temperatures such as those used herein. Most known zeolites would adsorb water, and/or are destroyed hydrothermally by high temperature steam An important property that the adsorbent needs to be used in the inventive systems and methods herein is resistance to being undesirably altered (e.g. degraded, losing selectivity, transitioning to a state other than solid state, for example) by the presence of water, even if water is adsorbed. Adsorbents such as activated carbons (in presence of water below approximately 50% of saturation) and silicalites are therefore considered good candidates by the inventors. In fact, in order to adsorb $CO_2$ selectively as desired, chemisorbents are considered ideal. Some chemisorbents have been studied by the inventors, including, for example, sodium activated aluminas. Such modified aluminas have shown experimentally resistance to high temperature steam, ability to adsorb $CO_2$ at high temperature and resistance to sulphur compounds.

Studies by (Beaver, M., Caram, et al.) have reported equilibrium isotherms for $CO_2$ chemisorption, as well as a linear driving force mass transfer coefficient as a function of temperature. Given the wealth of data available to us on sodium activated aluminas, we have decided to use this adsorbent as an example to develop the process presented here. Efforts are planned for the continued search for improved materials that can have higher capacity and are able to operate at lower temperatures (ideally close to 100 C). The Table of FIG. 4 shows the effectiveness of different adsorbents in this process obtained by computer simulation. Isotherm parameters were obtained from the literature and by measurements in this laboratory. Note on the table: NaAA is sodium activated alumina, AC-BS-270 C is an activated carbon manufactured by Burnaby and Satcliff, marked as 270C, the Silicalite used here corresponds to UOP HiSiv 3000.

Simulation model of the adsorption stage. A model of the adsorption process was implemented using ADSIM 2006.5, part of the Aspen One suite of AspenTech. (Aspen Technology, Inc., 200 Wheeler Road, Burlington, Mass. 01803 (www.aspentech.com). A vertical bed of one cubic meter of adsorbent was used to generate all the calculations. The simulation used an upwind form of the spatial first derivative and a central form of the second derivatives. Sixty grid points were used in the calculations. The momentum balance was solved using the Ergun equation, to provide pressure drops as needed. The energy balance was simulated rigorously, assuming bed and wall conduction and thermal dispersions. The mass dispersion was estimated using the Kast correlation (Kast, 1988).

The equilibrium model developed by (Beaver, Caram, etc.) was not available in the library of models of ADSIM, but was programmed in Fortran and compiled to obtain a customized equilibrium. The physical properties were estimated by using Property Plus (part of Aspen One) and using the Peng-Robinson equation of state. The Adsim flowsheet is shown FIG. 5.

Simulation Results. The interstitial gas concentration during adsorption and desorption over time is shown in FIGS. 6-7. As shown in FIG. 6, as the adsorption progresses the concentration profile steepens as expected for a type I isotherm. Conversely, the desorption the gas concentration profiles illustrated in FIG. 7 show the development of an expansion wave. The concentration of $CO_2$ in the solid state adsorbent at the beginning and end of the adsorption and desorption cycle is shown in FIG. 8. There is modest solid utilization with and average working capacity of about 0.2% of the solid weight.

The transient temperature profiles during adsorption and desorption as well as the temperatures are presented in FIG. 9, FIG. 10, and FIG. 11. The maximum temperature amplitude is about 7° K. FIG. 9 illustrates temperature profile changes in the bed during the adsorption step, taken at different moments of the step. FIG. 10 illustrates temperature profile changes in the bed during the desorption step in degrees Kelvin, taken at different times and moments of the step. FIG. 11 illustrates temperature profiles in the bed during and at the end of the adsorption and desorption steps, showing a maximum fluctuation of around 7 degrees K in this example.

In FIG. 12, the overall material balance for the example is illustrated in the Table I. As shown, the material balance is provided for the adsorption stage at about 450 degrees C. A person versed in the art of adsorption and simulation of adsorption will be able to reproduce the results shown using the teachings provided herein.

In FIG. 13, the summary of performance at various temperatures is illustrated. A person versed in the art of adsorption and simulation of adsorption will be able to reproduce the results shown using the teachings provided herein.

Optimizing temperature of operation: The results in the above table show that for a particular adsorbent, there is an optimal temperature range or temperature region for the operation of this process for each exemplary adsorbent used herein. At low temperature, we expect the rate of uptake to control the process and be slow. This tends to produce low CO2 concentration and recovery in the steam, and a significant proportion to go to the stack. If the temperature is too high, the capacity of the adsorbent becomes too low and the performance of the adsorbent and process decreases. The optimum temperature appears to be in the range from about 300 to about 450 degrees C. For example, at 450 C the concentration of $CO_2$ in steam is about 11.14% with a recovery of about 92.14%, with little or very little $CO_2$ losses through the stack (in this example, little being less than about 2.52%, and preferably less than about 10% in any example). This performance exceeds the specification of >90% recovery for this process. Operating the process at high temperature appears to present less of a challenge, since in this process streams are approximately balanced and heat exchangers can be used to recover heat. It is expected that only two additional trim heaters, and optionally a cooler, will be needed to make up for thermal losses in this example.

Another summary schematic of the exemplary process for this exemplary system is provided as FIG. 14. In this example, the schematic provides for a system and methods including an adsorption plant, the steam recompression and recovery plant, and the thermal recovery equipment needed to operate the adsorption steps at a selected temperature range, and preferably at a temperature that is optimized for the steps performed, as previously described herein. In this example, FIG. 14 shows the scheme of the overall process, specifically showing the two stages and the heat recovery system.

Lastly, the methods herein, such as the four step cycle embodiments, offer a considerable advantage over the prior art two-step cycles of adsorption and desorption (such as through thermal swing regeneration, for example). In a simulation with Adsim, those advantages are evident, as follows. In known 2 step cycles, a) the final composition of atmospheric gases ($N_2$) after condensation of steam is 30.8%, which considerably dilutes the $CO_2$ product captured to 69.19%. In the stack (clean gases), there is 8.17% of water vapor that is wasted to atmosphere, with loss of water, energy and with some negative environmental impact. Conversely, in the inventive 4-step cycles exemplified herein, the final composition of atmospheric gases ($N_2$) after condensation is now 3.46%, allowing for a purity of $CO_2$ of 96.53%, much better for capture of this gas. Further, in the stack gases, the level of water vapor has now dropped to 2.46%, a lower loss of water with less of environmental impact.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

What is claimed is:

1. A method to separate carbon dioxide from an exhaust stream from a combustion source, the method comprising a repeatable cycle comprising the steps of
    a. providing a bed comprising a $CO_2$ selective solid-state adsorbent selected to remain in its solid state and to retain its selectivity for $CO_2$ upon repeated exposure to steam at a preselected operating temperature;
    b. contacting the bed with a combustion exhaust gas to remove $CO_2$ from the combustion exhaust gas, thereby forming a solid-state adsorbent having bound $CO_2$ thereon, and a cleaned exhaust stream that contains less than about 5% $CO_2$;
    c. thereafter, contacting the bed containing solid-state adsorbent having CO2 adsorbed thereon with a sweep gas comprising steam to remove combustion exhaust gas remaining in the bed;
    d. thereafter, contacting the bed with steam to thereby remove $CO_2$ from the bed, and to thereby generate a gas comprising steam and $CO_2$;
    e. conveying the gas comprising steam and $CO_2$ to a vapor recompression system, and operating the vapor recompression system to thereby recover water, remove heat, and produce compressed $CO_2$ gas from the gas comprising steam and $CO_2$; and
    f. utilizing the water and heat recovered by the vapor recompression system to generate the sweep gas comprising steam,
wherein, upon performance of the cycle, more than about 90% of the carbon contained in the combustion exhaust gas is recovered.

2. The method of claim 1, wherein each of steps b, c, d and e are performed at a preselected operating temperature of between 100 degrees Celsius and 500 degrees Celsius.

3. The method of claim 1, wherein the cycle is autothermal.

4. The method of claim 3, wherein the method does not require thermal swing regeneration of the bed or the adsorbent.

5. The method of claim 1, wherein the step of providing a $CO_2$ selective adsorbent comprises providing at least one of: a zeolite, activated carbon, modified activated carbon, activated carbons impregnated with alkali metal oxides, activated carbons impregnated with carbonates, silicalite, alkali promoted hydrotalcites, or alkali promoted activated aluminas.

6. The method of claim 5, wherein the adsorbent comprises an alkali promoted hydrotalcite that is promoted with at least one of potassium or sodium carbonate.

7. The method of claim 6, wherein the CO2 selective adsorbent is sodium activated alumina, and wherein the preselected temperature is about 450 degrees Celsius.

8. The method of claim 1, wherein the method further comprises the step of adding heat at any step in the repeatable cycle to compensate for heat leaks.

9. The method of claim 1, wherein the repeatable cycle does not require executing a step of thermal swing regeneration.

10. The method off claim 1, wherein the repeatable cycle does not require a step of pausing for any heat up or cool down of the bed.

11. A method of separating carbon dioxide from an exhaust stream from a combustion source, the method comprising the steps of:
   a. providing a system comprising:
      i. a bed containing a solid state adsorbent, the bed having an inlet adapted for fluid communication with a combustion exhaust source;
      ii. a steam source, the steam source in fluid and thermal communication with the bed; and
      iii. a vapor recompression system, the vapor recompression system in fluid communication with the bed and in thermal communication with the steam source, the vapor recompression system configured and arranged to remove heat, water, and $CO_2$ from any gas stream comprising steam and $CO_2$ that is received from the bed;
   b. operating the system to perform the steps of
      i. contacting the combustion exhaust gas with a bed containing a $CO_2$ selective solid-state adsorbent to remove $CO_2$ from the combustion exhaust gas, thereby forming a solid-state adsorbent having bound $CO_2$ thereon, and a cleaned exhaust stream that contains less than about 5% $CO_2$;
      ii. thereafter, contacting the bed containing solid-state adsorbent having CO2 adsorbed thereon with a sweep gas comprising steam from the steam source to remove combustion exhaust gas remaining in the bed;
      iii. thereafter, contacting the bed with steam to thereby remove $CO_2$ form the bed, and to thereby generate a gas comprising steam and $CO_2$;
      iv. conveying the gas comprising steam and $CO_2$ to a vapor recompression system, and operating the vapor recompression system to thereby recover water, remove heat, and compressed $CO_2$ gas; and
      v. distributing heat and water recovered by the vapor recompression system to the steam source to generate steam for use within the system,
   c. wherein, upon operation of the system to perform the repeatable cycle, more than about 90% of the carbon contained in the combustion exhaust gas is recovered, and wherein the system is autothermal.

* * * * *